(12) United States Patent
Janzer et al.

(10) Patent No.: US 10,769,860 B2
(45) Date of Patent: Sep. 8, 2020

(54) TRANSFERRABLE BETWEEN STYLES VIRTUAL IDENTITY SYSTEMS AND METHODS

(71) Applicant: DG Holdings, Inc., Salt Lake City, UT (US)

(72) Inventors: Jesse Janzer, Sandy, UT (US); Jon Middleton, Salt Lake City, UT (US); Berkley Frei, Salt Lake City, UT (US)

(73) Assignee: DG Holdings, Inc., Salt Lake City, UT (US)

( * ) Notice: Subject to any disclaimer, the term of this patent is extended or adjusted under 35 U.S.C. 154(b) by 0 days.

(21) Appl. No.: 15/797,931

(22) Filed: Oct. 30, 2017

(65) Prior Publication Data

US 2018/0122147 A1    May 3, 2018

Related U.S. Application Data

(60) Provisional application No. 62/415,029, filed on Oct. 31, 2016.

(51) Int. Cl.
| | |
|---|---|
| *G06T 15/00* | (2011.01) |
| *G06T 19/20* | (2011.01) |
| *G06F 3/01* | (2006.01) |

(52) U.S. Cl.
CPC ............ *G06T 19/20* (2013.01); *G06F 3/011* (2013.01); *A63F 2300/209* (2013.01); *G06T 2200/24* (2013.01); *G06T 2219/2021* (2013.01); *G06T 2219/2024* (2013.01)

(58) Field of Classification Search
CPC . G06F 3/011; G06T 19/20; G06T 2219/2021; G06T 2219/2024

USPC ........................................................ 345/419
See application file for complete search history.

(56) References Cited

U.S. PATENT DOCUMENTS

| | | | |
|---|---|---|---|
| 8,522,330 B2 | 8/2013 | Shuster et al. | |
| 2008/0052242 A1* | 2/2008 | Merritt ................... | G06F 21/10 705/59 |
| 2010/0177117 A1* | 7/2010 | Finn ........................ | G06F 3/14 345/619 |
| 2010/0203968 A1* | 8/2010 | Gill ......................... | G06T 13/40 463/32 |
| 2012/0190458 A1 | 7/2012 | Gerson et al. | |
| 2013/0275886 A1 | 10/2013 | Haswell et al. | |
| 2013/0290106 A1* | 10/2013 | Bradley ................. | G06Q 90/20 705/14.64 |
| 2014/0132633 A1* | 5/2014 | Fekete ................... | G06T 11/60 345/634 |
| 2015/0024852 A1* | 1/2015 | Pacey ..................... | A63F 13/67 463/43 |

(Continued)

*Primary Examiner* — Charles Tseng
(74) *Attorney, Agent, or Firm* — Stoel Rives LLP; R. Whitney Johnson; Andrew Wasden

(57) ABSTRACT

A system for switching a 3D asset between art styles, including a user interface to receive an art style selection, and a 3D character software development kit (SDK) engine. The 3D character SDK engine receives a selected art style from the user interface, determines identifying characteristics of the 3D asset, removes the identifying characteristics from the 3D asset to return the 3D asset to a base figure, receives style deformations based on the selected art style, applies the style deformations to the base figure to form a new 3D asset based on the selected style, and applies the identifying characteristics to the new 3D asset based on the selected style.

18 Claims, 6 Drawing Sheets

(56) References Cited

U.S. PATENT DOCUMENTS

| | | | |
|---|---|---|---|
| 2015/0123967 A1* | 5/2015 | Quinn | G06T 13/40 |
| | | | 345/420 |
| 2015/0143487 A1* | 5/2015 | Nathan | H04L 63/08 |
| | | | 726/6 |
| 2016/0035142 A1* | 2/2016 | Nair | G06T 19/20 |
| | | | 345/420 |
| 2016/0078400 A1* | 3/2016 | Altieri | H04N 5/225 |
| | | | 705/28 |
| 2016/0292925 A1* | 10/2016 | Montgomerie | G06T 19/006 |
| 2017/0011549 A1* | 1/2017 | Pinskiy | G06T 19/20 |

* cited by examiner

TRANSFERRABLE BETWEEN STYLES VIRTUAL IDENTITY SYSTEMS AND METHODS

RELATED APPLICATION

This application claims the benefit under 35 U.S.C. § 119(e) of U.S. Provisional Application No. 62/415,029 filed Oct. 31, 2016, which is hereby incorporated by reference herein in its entirety.

TECHNICAL FIELD

The present disclosure relates to electronic or other virtual representations of an individual or entity in a computer generated environment. In particular, the present disclosure relates to systems and methods for transitioning virtual identities between art styles.

DETAILED DESCRIPTION OF PREFERRED EMBODIMENTS

Figure 1:
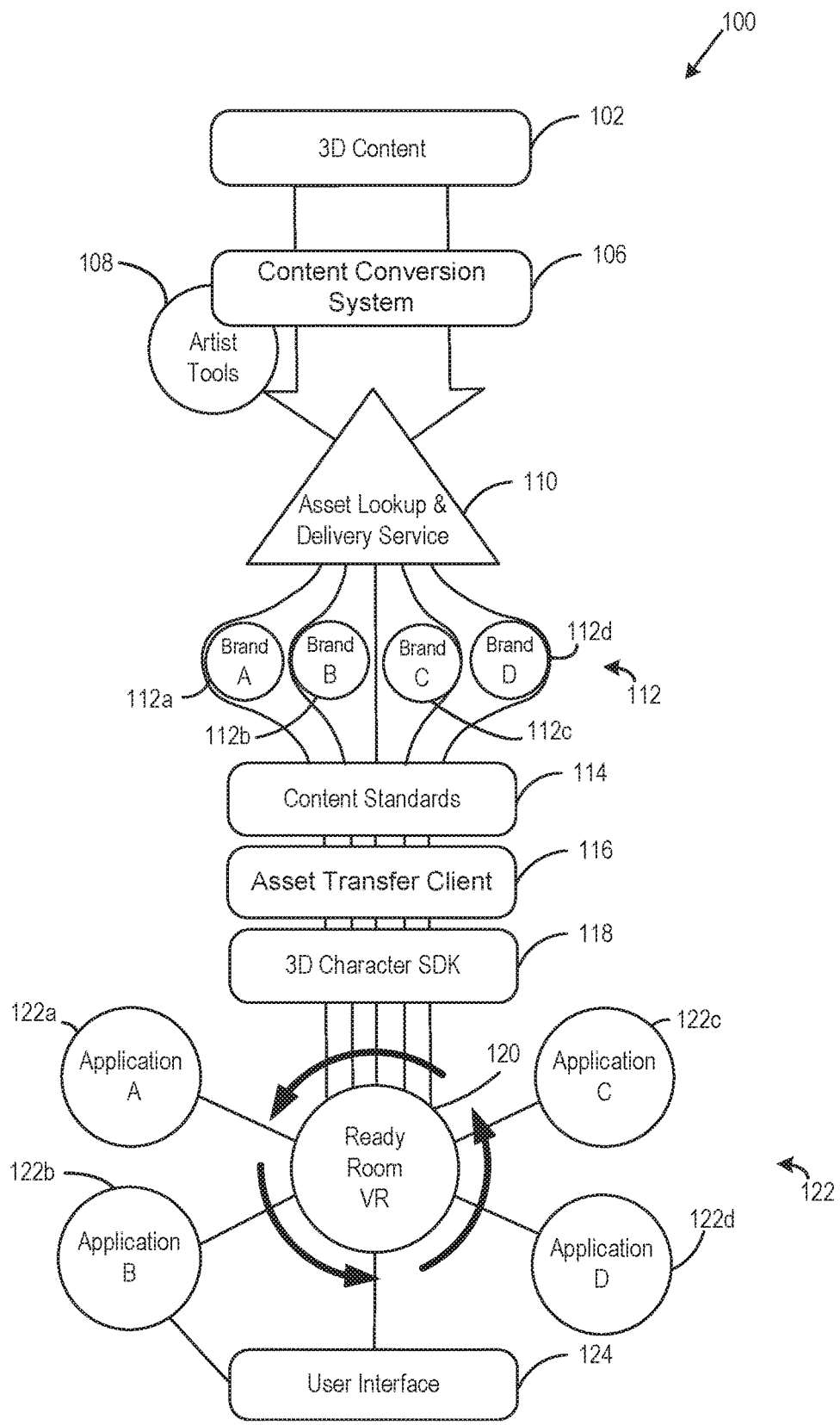
FIG. 1 is a system diagram for a persistent virtual identity system, according to one embodiment.

Individuals are increasingly interacting with computing devices, systems, and environments and with other individuals in electronic or virtual forums, such as in computer games, social media and other Internet forums, virtual/augmented reality environments, and the like, sometimes referred to as cyberspace. These electronic interactions, whether individual-machine interactions or individual-individual interactions, increasingly are facilitated by a concept of virtual identity for each party to the interaction, which may be referred to as an application identity. The virtual identity enables a given party to identify itself to other entities in an interaction and/or enables other parties to recognize or identify the given party during the interaction.

A virtual identity can be embodied as simple as a profile, and can be more complex such as including an avatar or other graphical representation, a persona (e.g., an aspect of character of the virtual identity that is presented to or perceived by others), and/or a reputation (e.g., beliefs or opinions that are generally held about the virtual identity). In virtual reality (VR) applications, virtual identity can be very complex in order to provide a fuller, richer identity to other entities in VR encounters or other interactions. A virtual identity can be used to associate application data with a user. For example, a virtual identity can be used to correlate user data, application settings, pictures, and/or profiles with users, among other types of application data.

Presently, virtual identities are limited to a single application (e.g., specific to a given application and nontransferable to other applications). That is, a user may create a virtual identity for a given application and that virtual identity is not portable to, or persistent in, a different application. A user must create a separate virtual identity to use with each of a plurality of applications. As such, the user may have the burden of managing and/or maintaining a plurality of virtual identities. If the user experiences a change (e.g., a change of name, address, phone number, or the like), or desires to effectuate a change to a virtual identity (e.g. a change of an aesthetic feature such as an icon), then the user may have the burden of propagating the change through a plurality of virtual identities, each corresponding to a different application.

As virtual identities grow more complex and detailed (e.g., including greater amounts of associated information) the burden on a user may be further enhanced. For example, if the application identity is associated with a virtual application having a visual aspect, then the virtual identity may include a virtual avatar and other types of data associated with the virtual identity. A user may create, manage, and/or maintain a different virtual avatar for each of a plurality of virtual applications. If a user makes a change to an avatar associated with one virtual identity (e.g., a change of hair color), the user would need to then make the same change to the avatar associated with each other virtual identity in which the user may interact. In other words, if a user wants consistent (e.g., identical or similar) virtual identities across multiple applications, then when the user changes the hair color (or most any other visual aspect, such as shape, height, muscle definition, tattoos, sex, art style, default animation sets) of an avatar (e.g., a bipedal humanoid character) for a given virtual identity in one application the user will also have to make that same change for all other applications in which the user desires the corresponding avatars and/or virtual identities to be consistent.

A persistent virtual identity (e.g., including such aspects as an avatar, persona, reputation, etc.) that is portable across applications and/or platforms may be desirable. In some embodiments of the present disclosure, a single persistent virtual identity can be created, managed, and maintained for (and may be portable to) a plurality of applications, platforms, and/or virtual environments, whether social, business, gaming, entertainment, or any other platform that facilitates or otherwise wants users to have a visual presence in it.

An application can be a standalone computer program. An application can be a computer program to perform a group of coordinated functions, tasks, or activities for the benefit of a user. A video game may be an example of an application. An application that is a standalone computer program may optionally include or interact with online or remotely located components, such as data stores and cloud computing resources. A platform can be a group of different applications, services, and/or computing resources that provide a broader service. A platform can be or otherwise provide the environment in which an application is executed, and may include the hardware or the operating system (OS), or other underlying software (e.g., the stage on which applications and other computer programs can run). A platform may be heavily tied to or directed to an online functionality, such that the different applications, services, and/or computing resources may be distributed, or remotely located and interconnected via a network. A platform can provide a computing environment for a virtual environment (e.g., a virtual world). A persistent virtual identity can be developed and/or employed in multiple applications, platforms, and/or virtual environments.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods or components. Further, in some cases, well-known structures, or operations are not shown or described in detail in order to avoid obscuring aspects of the embodiments. Furthermore, the described features, structures, or characteristics may be combined in any suitable manner in one or more embodiments.

FIG. 1 is a system 100 diagram for a persistent virtual identity system according to one embodiment. The system 100 can include 3D content 102, a content conversion system 106, artist tools 108, an asset lookup and delivery service 110 (and/or library), content standards 114, an asset transfer client 116, a 3D character SDK 118, and a ready room in virtual reality (VR) 120. The system 100 can also include brand modules 112a, 112b, 112c, and 112d (sometimes referred to generally and collectively as "brand module(s) 112"). The system 100 can include a plurality of applications 122a, 122b, 122c, 122d (sometimes referred to generally and collectively as "application(s) 122") As can be appreciated, in some embodiments the applications 122 may be on a single common computing platform (e.g., in a common VR environment). In other embodiments, one or more on the applications may be on different, unique computing platforms. A user may interact with the system 100 by way of a user interface 124 that interfaces via the applications 122 and/or the ready room VR 120. The user interface 124 may be or operate on a user computing device. A user of the system 100 may include electronic users, such as a bot or an AI application, in addition to human users.

The system 100 can provide the ability to create and/or maintain a persistent virtual identity and/or a corresponding 3D asset(s), and to enable transport of such between applications (e.g., different games) and/or platforms (e.g., different augmented reality (AR) or VR systems). As used herein, the persistent virtual identity can include a base 3D asset (e.g., an avatar model and modifications thereto), following 3D assets (e.g., clothing, accessories, etc.), history associated with a user of the system, social reputations, social standing, inventory, wardrobe (e.g., additional clothing following 3D assets, which may include pre-saved outfits), and/or trophies, among other items associated with the persistent virtual identity. A virtual identity may include multiple 3D assets, which can include one or more base 3D assets (e.g., multiple avatars) and one or more following 3D assets. The 3D asset(s) can be at least partially defined using geometric data. The 3D asset(s) can further be presented as an avatar associated with the persistent virtual identity. For sake of simplicity, a "3D asset" referenced hereafter may be a base 3D asset, a following 3D asset, or a combination of one or more of these.

The applications 122 can be VR applications. The applications 122 can be independent of each other. The applications 122 can be gaming applications, social media applications, instructional applications, business applications, and/or any other type of application employing VR techniques. The brand modules 112 can provide conformity standards for the applications 122. That is, a 3D asset generated in the system 100 can conform to the standards defined by the brand modules 112 to be compatible with the respective applications 122. The applications 122 may all be on a single platform (e.g., HTC Vive®, Oculus Rift®, PlayStation VR®), or may be on different platforms.

In some examples, the applications 122 and/or the brand modules 112 can be external to the system 100. That is, the applications 122 and/or the brand modules 112 can be implemented independent of the system 100 (e.g., separate and distinct from the ready room VR 120, the asset lookup and delivery service 110, and the content standards, 114, although interfacing or otherwise communicating such as through an API). The applications 122 and the brand modules 112 are correlated. Stated differently, the brand modules 112 correspond to and provide standards, rules, protocols, and/or the like for the applications 122. For example, the application 122a is associated with the brand module 112a, the application 122b is associated with the brand module 112b, the application 122c is associated with the brand module 112c, and the application 122d is associated with the brand module 112d.

The system 100 can enable a persistent virtual identity that is portable and persistent to exist and be transported between the applications 122. A developer and/or a user can integrate or otherwise interconnect with the system 100 (e.g., via applications 122 and/or user interface 124, and generally over a network) to both create a persistent virtual identity, and potentially to interact with other persistent virtual identities created by and corresponding to other users. The user and/or the application developer can exercise control over the created persistent virtual identity. For example, the user can, through the user interface 124, interconnect with the ready room VR 120 to manipulate the virtual identity. The user can also manipulate the virtual identity through applications 122. FIG. 1 shows the user interface 124 interconnected with the system 100 through the ready room VR 120 and the application 122b.

The system 100 can include a three dimensional (3D) character software developer kit (SDK) 118 (e.g., an MCS Plugin). The 3D character SDK 118 may be a library that can be implemented in an application 122. The 3D character SDK 118 includes functionality to perform operations like create 3D assets (e.g., avatars, in a scene), shape them, add/remove clothing and other following 3D meshes, etc. The 3D character SDK 118 also includes functionality to obtain 3D models (for base 3D assets) and accompanying information from the local cache (and if a 3D model and/or accompanying information isn't in the local cache, the 3D character SDK 118 can transparently fetch the 3D model and/or accompanying information from the cloud). The 3D character SDK 118 can also transform 3D models into game ready objects, namely 3D assets. The 3D character SDK 118 can also provide other asynchronous operations, which provides an event or task queue.

The system 100 can also include an asset transfer client 116 (e.g., ready room plugin) and an asset lookup and delivery service 110 (and/or library). The asset transfer client 116 and the asset lookup and delivery service 110 can be local and/or remote to the system 100. That is, the asset transfer client 116 and/or the asset lookup and delivery service 110 can be executed (e.g., hosted) on a network computing device remote to the system 100 that can be accessed by the applications 122. As used herein, the asset lookup and delivery service 110 allows the asset transfer client 116 to request a specific 3D asset with permutations on the request for specific level of detail, material, and texture variation. The asset lookup and delivery service 110 can also provide (e.g., stream) the 3D asset to the asset transfer client 116. As used herein, a material may be a combination of texture files, shaders, and different maps that shaders use (normal map, occlusion map) and other data such as specularity and metallic levels depending on the material type. A material may be a visual layer that makes something within a 3D asset look like more than just polygons.

The asset transfer client 116 can include two or more components remotely located from each other and communicating together, such as over a network. A first component of the asset transfer client 116 can be implemented in the user interface 124 and/or the applications 122. A second component of the asset transfer client 116 can be implemented in the system 100. The first component of the asset transfer client 116 can communicate with the second component of the asset transfer client 116, for example to request a 3D asset. The component of the asset transfer client 116 implemented in the system 100 can request or otherwise obtain the 3D asset from the asset client lookup and delivery service 110.

The system 100 can also include the content standards 114 which includes standards for the brand modules 112 and/or the applications 122. The content standards 114 can specify types of content or groups of content based upon the creator of the asset, the genre of the asset, or the art style of the asset. The content standards 114 can specify types of content or groups of content through the use of filters. The filters can operate on metadata associated with the 3D assets comprising the content or groups of content. The metadata can identify a vendor from which the 3D asset originated, a genre of the 3D asset, and an artistic style of the 3D asset, among other types of data included in the metadata.

A genre can include, for example a fantasy genre, a science fiction (sci-fi) genre, a comic book genre, and/or contemporary genre, among other genres. An artistic style can be defined by vendors who create new artistic styles. The system 100 can have a default artistic style such as a Nikae artistic style and a Minecraft-esque artistic style.

The content standards 114 can also specify what types of 3D assets are allowed in respective applications 122 and/or what types of 3D assets are not allowed in respective applications 122. For example, the content standards 114 can define that 3D assets with a default artistic style and a fantasy genre are allowed in a given corresponding application 122c and that 3D assets of a different artistic style and a different genre are not allowed in the application 122c.

The content standards 114 can also specify that 3D assets originating from a particular vendor are allowed in a corresponding application from the applications 122. For example, the content standards 114 can restrict the transfer of 3D assets to the application 122d to 3D assets that were originated by a vendor of the application 122d.

The content standards 114 can define 3D assets that are restricted from specific brand modules 112 and/or applications 122 to maintain consistent or inconsistent visual effect. The content standards 114 can be implemented in the asset lookup and delivery service 110 to regulate content provided to the applications 122. The content standards 114 can also be implemented in applications 122 and/or the user interface 124 as part of the asset transfer client 116 to regulate content downloaded and cached at the applications 122 and/or the user interface 124.

The artist tools 108, the content conversion system 106, and the ready room VR 120 may be supporting systems to the system 100. Stated otherwise, they may be supplemental and/or ancillary to the system 100, such that they could be implemented separately and distinctly (e.g., on a different computing device, network, or the like) from other elements of the system 100. The artist tools 108 can modify 3D assets to make the 3D assets compatible with the 3D character SDK 118. The content conversion system 106 can convert the 3D content 102 to be performant (e.g., to perform well, such as within performance metrics) for run time applications. The content conversion system 106 can also convert the 3D content 102 to be compatible with the 3D character SDK 118. The 3D content 102 can include, for example, high fidelity photo-real assets and/or low fidelity game-ready assets. The 3D content 102 can be created, for example, by a 3D content creator such as a Daz® 3D application.

The ready room VR 120 can be an application. The ready room VR 120 can be a hub and/or a starting point for persistent virtual identity creation. The ready room VR 120 can also be a default process for moving persistent virtual identities between applications.

The 3D character SDK 118 can enable a base figure (e.g., a base 3D asset representing an avatar that is part of a persistent virtual identity, or other base 3D asset) to be changed into any shape and/or size and retain full functionality for fitting clothing, animating, and/or customizing. Using the 3D character SDK 118, the base 3D asset can be extendable to a potentially unlimited number of variations for creation of a unique avatar. Stated otherwise, characteristics of a 3D asset can be modified in a potentially unlimited number of combinations of variations. Then the system 100 can enable the resultant unique avatar to retain a visual identity across artistic stylings (e.g., if the application 122a implements a first styling, for example a cartoon styling, and the application 122b implements a second styling, for example a realistic styling, then the unique avatar can retain a visual identity as the avatar is shown in a cartoon styling in the application 122a and a realistic styling in the application 122b). The 3D character SDK 118 can include a number of modules and/or services for performing specific operations to modify or otherwise configure characteristics of 3D assets. For example, the 3D character SDK 118 can include a morphing module, a joint center transform (JCT) bone module, a standard shape module, a projection module, a head scanning to a dynamic mesh fitting module, a heterogeneous mesh behavior module, a hair module, and a smart props module.

The artist tools 108 is one or more standalone modules, potentially including computer-readable instructions configured to convert 3D assets to a form/format compatible with the system 100. The artist tools 108 can receive a 3D asset (e.g., geometry), which may be configured in a number of different formats. The artist tools 108 can be configured to group the geometry into items; set up the level of details (LODs) for an item; generate geographical maps (geomaps); add self-defining behavioral information to objects for run-time simulation; set up materials and generate materials for different platforms; configure the geometries' multilayered characteristics for runtime-optimized multilayer depth and volumetric preservation between meshes; and/or set up zones on items for heterogeneous mesh deformation (e.g., so that something like metal deforms differently than cloth to an avatar's shape). As used herein a geomap comprises geometry, a vertex index, and a map outlining an optimized correlation between a following mesh and base mesh to be used for real time calculation and generation of multilayer depth solutions and/or projection solutions. Projection references the act of projecting a deformer from one mesh to another.

The artist tools 108 also set up the custom shaping of a base 3D asset and set up the 3D assets into specific art styles to allow automatic avatar preservation between art styles. The output of the artist tools 108 can be either a single 3D asset and/or a collection of 3D assets which can be compatible with the 3D character SDK 118. The 3D assets modified by the artist tools 108 can be uploaded to the asset lookup and delivery service 110. The 3D assets can further be configured at the asset lookup and delivery service 110 for user specified distribution based upon rules and conditions associated with the 3D asset and as provided by the brand modules 112.

The ready room VR 120 can be a base application that facilitates interaction between a user and the system 100. A base application can be different from the applications 122, such that the base application is a standalone application that can be executed independently from the applications 122. The user can create and customize a 3D asset via the ready room VR 120 using additional content (e.g., following 3D assets) converted with the artist tools 108, made available through the asset lookup and delivery service 110, delivered through the asset transfer client library 116, and passed to the 3D character SDK 118. For example, the user can, via the user interface 124, access the ready room VR 120 to create and/or customize a 3D asset and launch at least one of the applications 122 through the ready room VR 120.

In some examples, the user can create and customize an avatar (or otherwise configure a base 3D asset) via the application 122b. For example the user can access the application 122b and through the application 122b access the ready room VR 120, or functionality of the ready room VR 120 (e.g., to create and customize a 3D asset). Stated differently, functionality of the ready room VR 120 may be implemented or otherwise integrated with the application 122b, such that a user of the application 122b can create and/or customize an avatar or other 3D assets within the a context of the application 122b.

The ready room VR 120 can showcase the core functionality of the system 100 from an end user's perspective. The ready room VR 120 can provide both a place to customize a 3D asset, including an avatar, a shape and/or clothing associated with the 3D asset, and a place to demonstrate the process and/or standards of "walking between applications." The ready room VR 120 provides multiple means to transfer an identity between applications 122, interconnect between multiple open VR applications 122, and incorporate face scan data onto the avatar. The ready room VR 120 can provide different example implementations of a user interface (UI) for shopping, previewing, and/or checking out of stores, among different types of checkout processes.

Once compatible content is acquired, a user can use and customize the 3D asset. A persistent virtual identity for the user can be created, and then the user can activate a mechanism to allow an acquired and/or created 3D asset (e.g., avatar) to transport (e.g., transfer) or step into any one of the applications 122. That is, a 3D asset associated with a user can retain an identity as the 3D asset transitions from the ready room VR 120 into one of the applications 122, and then provide end points for the user to return to the ready room VR 120. The virtual identity of a user, including a corresponding avatar or other 3D asset, can be maintained consistent across multiple applications 122, and as the virtual identity is transported from one application 122, to the ready room VR 120, and/or to another application 122. The 3D asset can also extract and retain items (e.g., a virtual weapon, or other object 3D asset) from the applications 122 that can persist in the ready room VR 120 as the 3D asset transitions from one of the applications 122 into the ready room VR 120 and then to another of the applications 122.

The persistent virtual identity can be associated with, and representative of a user that is external to the system 100. A user can be a human user and/or an automated user.

In some examples, transitioning a 3D asset from a first application (e.g., application 122a) to a second application (e.g., application 122b) can include conforming to standards set by the second application. The standards can include a specific art style and/or theme. Transitioning a 3D asset from a first application to a second application can include placing the 3D asset in a VR room (e.g., lobby) of the first application 122a where the user and/or the 3D character SDK can initiate the required changes to the 3D asset before fully transitioning the 3D asset to the second application.

The transfer of 3D assets between applications includes configuring a 3D asset so that the 3D asset's customizations are retained as the 3D asset transitions from one application to a different application, such that the settings and status of the 3D asset remain the same. The transfer of 3D assets is one example of a persistent virtual identity. The transfer of 3D assets can be accomplished by utilizing a local backdoor module and/or a remote restore module. These modules enable the transfer of an identity between applications 122.

The local backdoor module can include an application 122a calling the asset transfer client 116 to export a 3D asset (e.g., a 3D asset file) and/or a persistent virtual identity (e.g., an identity file) comprising geometry, skinning, rig, textures, materials, and shaders of the current 3D asset with associated items in use, and/or any additional metadata describing the 3D asset and/or persistent virtual identity. After the export is finished, the application 122a launches the application 122b with reference to the local identity file, and then shuts itself down. The application 122b can access the identity and request the local identity definition from the asset transfer client 116 and load the identity into the application 122b.

The remote restore module can be configured to cause the application 122a to call the asset transfer client 116 to push the identity definition metadata to the asset lookup and delivery service 110. The application 122a can then launch the application 122b with an identity string, and then shut itself down. The application 122b can request that the asset transfer client 116 call the asset lookup and delivery service 110 requesting the identity string. The application 122b can likewise retrieve metadata associated with the persistent virtual identity. The application 122b can use either local 3D assets (e.g., locally stored) or remote 3D assets (e.g., streamed or otherwise provided or accessed from a remote location) to render the avatar.

In some examples, the asset transfer client 116 can comprise one or more components. For example, the asset transfer client 116 can comprise a client and a server. The client can be implemented in the applications 122 and/or computing devices on which the applications 122 are executing. The server of the asset transfer client 116 can be implemented in the system 100. The client can communicate with the server to transfer a 3D asset from the system 100 to the computing device of the applications 122.

To transfer a 3D asset and/or persistent virtual identity between applications, the user can select a destination application 122b from a source application 122a. Once selected, a gate or portal may be generated within the source application 122a. The source application may portray the gate and/or portal as a visual appearance branded for the destination application 122b. The gate and/or portal may transition the 3D asset and/or persistent virtual identity from the source application 122a to virtual space (e.g., referred to as the "airlock") that is configurable and customized by the destination application 122*b* (e.g., a destination application vendor and/or the corresponding brand module 112*b*). The mechanism to trigger the transfer of a 3D asset may include walking and/or other locomotion methods within a VR environment provided by the source application 122*a* toward the gate or portal of the destination application 122*b*.

The transferring of the 3D asset and/or the persistent virtual identity from source application to the virtual space through the virtual portal may trigger a VR passport check. The VR passport check compares clothing and/or an art style associated with the 3D asset and/or the persistent virtual identity with vendor specific standards of the destination application 122*b*. If the 3D asset and/or persistent virtual identity does not conform to the destination application 122*b*, then the user is provided an opportunity to change clothing, art style, or any other aspect associated with the 3D asset and/or persistent virtual identity, to meet the destination application standards. Once the standards are met, a launch mechanism, through another virtual portal, the pushing of a button, or the act of meeting the standards, will initiate a transfer of the 3D asset and/or the persistent virtual identity between the source application 122*a* and the destination application 122*b*.

A set of standards between applications 122 and vendors can be defined. The standards can foster an increased level of persistence and transfer to exist between different applications 122. The standards enable enhanced functionality to allow standard behavior and transfer of assets or mechanics between disparate applications 122. For example, an application agnostic content interchange can be defined to facilitate the association between 3D assets and/or persistent virtual identities and a given application 122*a* (e.g., a source application 122*a*) and the transfer of the persistent virtual identity to other applications 122 (e.g., a destination application 122*b*). Transferring the persistent virtual identity and/or 3D asset can include losing permanence in the source application 122*a* and creating permanence in the destination application 122*b* with a conforming set of behaviors, mechanics, and appearances.

In some examples, face scan data can be associated with a dynamic mesh. Associating scan data with a dynamic mesh can include taking face scan data and changing a base figure, associated with the 3D asset and/or persistent virtual identity, to incorporate the face scan data such that the base figure retains the same mesh topology while retaining functionality for further shaping of the mesh (e.g., making the face narrower, nose larger, ears pointed, etc.).

The face scan data can be placed on a dynamic mesh. The face scan data can be 3D scanner generated and/or photogrammetry generated (e.g., mesh and texture). The face scan data can also be generated using various images and/or other means. Placing the face scan data on a dynamic mesh can deform the base figure associated with a 3D asset and/or persistent virtual identity to match the visual appearance of the face scan data. Placing the face scan data on a dynamic mesh can generate texture to match the face scan data on the base figure associated with the 3D assets and/or persistent virtual identity.

The face scan data can be compared with the base figure to identify where key facial and head landmarks are on both sets of data (e.g., face scan data and base figure and/or base 3D asset). The base mesh associated with the base figure is deformed to the same shape as the face scan data using automated adjustments of existing blend shapes for each key region of the face. In some examples, a new blend shape can be generated for the base figure to match the face scan data. The face scan generated texture can be analyzed and, using key face and head landmarks, the texture can be rebuilt to fit the base figure's UV map. The face scan generated texture can comprise multiple texture files. The multiple texture files can be combined into a single texture file for the head of a base figure. Fitting face scan data to a base figure can be performed using a custom rig and geomap technology to compare and match the base figure mesh to the face scan data. As used herein, blend shaping, morphing, and deforming references a set of data attached to a mesh which contains positional deltas on geometry and bones to allow the mesh to change shape while not changing its fundamental geometry and/or rig.

When configuring an avatar, if there is face scan data associated with the 3D asset and/or the application identity associated with the 3D asset, the ready room VR 120 can associate the face scan data with the 3D asset such that the 3D asset retains the full customization and compatibility of the base figure without any scanned data. As such, a 3D asset can be configured with the face scan data. The face scan data can be provided, by the user, by uploading a mesh to a server associated with system 100 through at least one of a web form or mobile application.

As used herein, the system 100 can be implemented in a single computing device and/or over a plurality of computing devices. For example, each of the components of the system 100 can be implemented using independent computing devices coupled via a network. In some examples, the system 100 can be implemented using cloud services.

Figure 2:
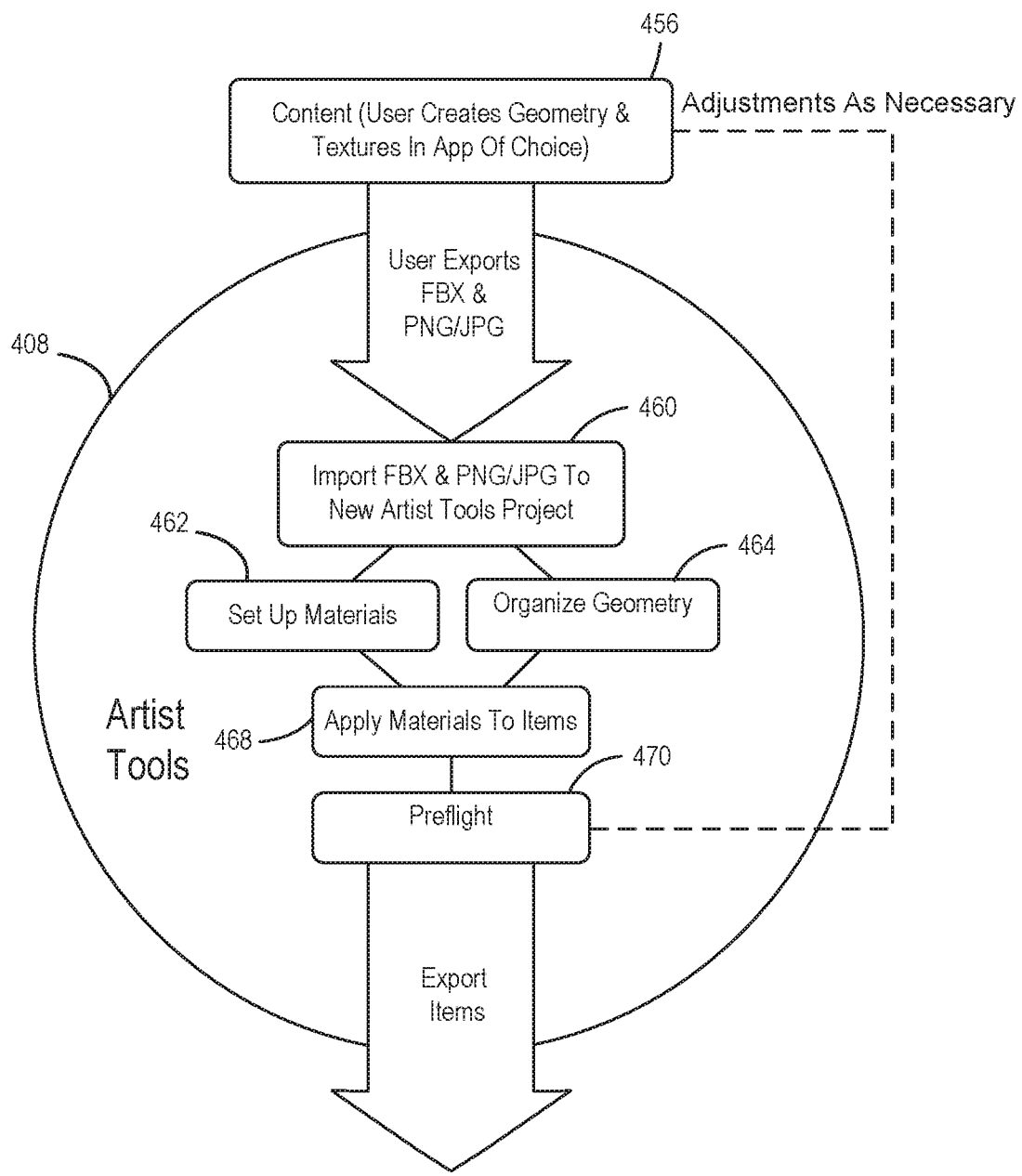
FIG. 2 is a block diagram of artist tools, according to one embodiment.

FIG. 2 is a block diagram of artist tools 408 according to one embodiment. The artist tools 408 include an import module 460, a materials module 462, a geometry module 464, an application module 468, and a preflight module 470.

A user (e.g., 3D artist) can export content 456 created using a 3D content creation application (e.g., Maya, Blender, and/or 3DS Max) to a filmbox format (e.g., FBX), a portable network graphic (PNG) format, and/or a joint photographic expert group (JPEG) format (e.g., JPG format), among other possible formats. The 3D artist can also export textures and materials, in standard formats, associated with the content created using the 3D content creation application.

The artist tools 408 is a standalone application that imports the content 456 (e.g., in the standard format exported from the 3D content creation application) and configures the content 456 to be compatible with the 3D character SDK. The content 456 can be imported via the import module 460. The content 456 can include user created geometry and textures.

The user can then create a new project and import the content 456 (e.g., FBX file) into the project. The content 456 can include geometry, materials, rig, and/or textures. The content 456 can be parsed. The organize geometry module 464 enables a user to organize the geometry into items. The user can also create metadata and associate the metadata with the items to allow the items to be identified. The metadata can provide an automatic behavior associated with the items. The metadata can also provide a level of detail groups for the items.

The artist tools 408 can also configure new materials or select existing materials via the materials module 462. The artist tools 408 can also apply the material to the items via the application module 468 by associating the materials with the corresponding items. Once set up, the items are prepped and tested to ensure that the items function properly. The items can be tested via the preflight module 470. The test can include geomap generation, alpha injection mapping using multilayer depth preservation techniques, auto skinning of the asset if needed, setting up heterogeneous mesh behavior, and/or more.

Once the tests are complete, a user (e.g., 3D artist), via the artist tools 408, can drive the content through fitting to a base figure, and test out the deformation and animation to ensure that the content functions properly. The user can make adjustments as necessary to ensure that the content functions properly. The artist tools 408 can then export the items in standard formats to other applications. The artist tools 408 can also export the items in formats accepted/recognized by the 3D character SDK.

Figure 3:
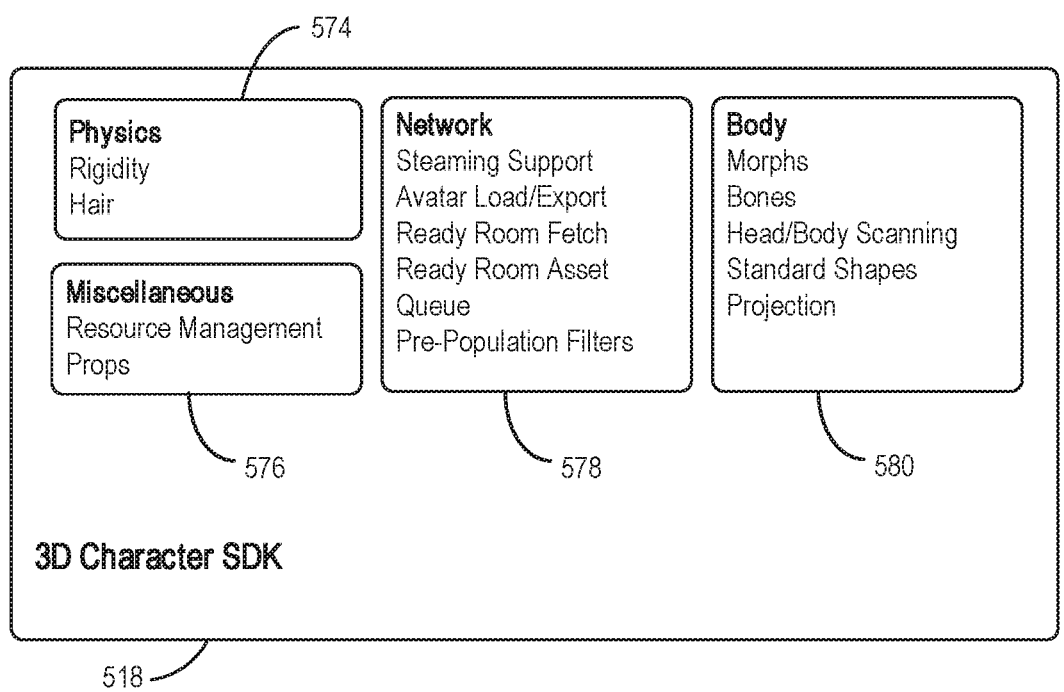
FIG. 3 is a block diagram of a 3D character SDK, according to one embodiment.

FIG. 3 is a block diagram of a 3D character SDK 518 according to one embodiment. The 3D character SDK 518 comprises a physics module 574, a miscellaneous module 576, a network module 578, and a body module 580.

The 3D character SDK 518 provides a list of independent functionalities and calls to drive the content in specific ways. The 3D character SDK 518 can be used to fit clothes on a 3D asset, generate deformations of the 3D asset, transition between art styles, transform bone structures associated with the 3D asset, and/or affect heterogeneous mesh behavior, rigidity, and/or hair.

For example, rigidity and/or hair associated with a 3D asset can be configured via the physics module 574. Resource management and props associated with the 3D asset can be configured via the miscellaneous module 576. The streaming support, the avatar loading/exporting, the ready room fetch, the ready room asset queue, and/or the pre-population filters can be configured via the network module 578. The morphing, the bone structure, the head/body scanning, the standard shapes, and/or the projection associated with a 3D asset can be configured via the body module 580. The 3D character SDK 518 can perform specific tasks without a specific flow or process across the 3D character SDK 518.

The network module 578 includes a subset of network calls to pull down or push up data. Streaming support is a custom 3D file format optimized for streaming data and is platform agnostic. Avatar load/export includes calls for loading in an avatar definition, saving an avatar definition, and exporting an avatar to a different application. RR Fetch and RR asset queue go hand in hand in that RR Fetch fetches assets by putting them into an asynchronous RR asset queue for streaming down, caching, and loading in of assets from the web to a local location, so that, once downloaded, they can be accessed quickly from a hot or warm cache. Pre-population filters may include application filters that different queries are automatically filtered by so that only content that an application allows to come in will get sent from the network SDK.

The body module 580 includes operations to modify an appearance of a 3D asset. Morphs are the delta change of the vertices, also known as blend shapes, that shapes the geometry to different orientations, so going skinny to fat is through these. Bones are bits of 3D data that may be analogous to a skeleton that vert influence levels are associated with and that allow the movement and animation of a 3D asset (e.g., a figure or avatar). Head/body scanning is an example of new technology of taking scan data and generating morphs and materials to match it so it fits within the system and rig instead of generating all new 3D data. Standard shapes may enable theme swapping of a standard set of shaping. Projection relates to runtime projection and mapping.

As mentioned above, the 3D character SDK 118 or 518 can be used to transition a 3D asset to a different art style while maintaining the identifying portions of the original 3D asset. Once a user has created a unique 3D asset via the user interface 124 through the ready room VR 120, the user may desire to change the art style of the original 3D asset. A user may select an art style via the user interface 124 in the ready room VR 120 for the unique 3D asset. The 3D character SDK 118, 518 then transitions the original 3D asset to a new 3D asset in the selected art style. For example, by selecting "comic" art style, "anime art style," or "lego block" art style, the visual shape, materials, and shaders of the unique avatar are changed to visually fit with the selected art style while retaining identifying proportions and marks of the unique avatar originally created by the user.

Figure 4:
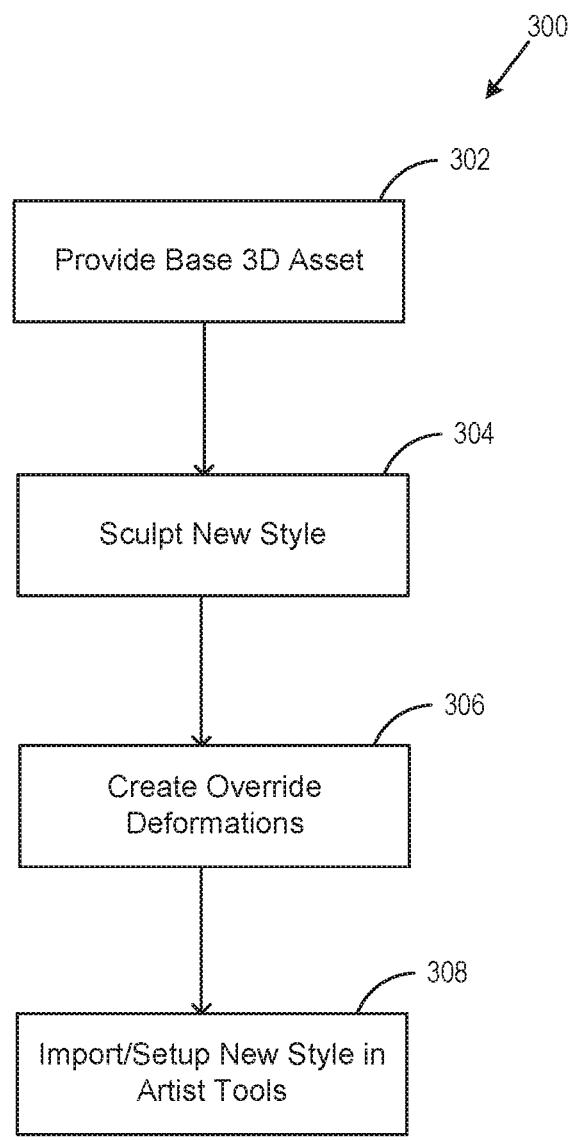
FIG. 4 is a flow chart for creating a new art style, according to one embodiment.

FIG. 4 is a flow chart 300 illustrating a process for creating and setting up the new art styles in the system 100. To create a new art style, base figures (e.g., base 3D assets) for a male figure and for a female figure are provided 302. The new art style is then sculpted 304 onto the base figure. An artist or vendor sculpts 304 the new art style onto the base figure by reshaping the mesh of the female base figure and the male base figure according to the desired art style. While the mesh is reshaped, the vertices and polygon count and order are maintained for the base figures. In some embodiments, new materials and shaders are created for the new art style shape. In addition, in some embodiments, key landmarks of the anatomy may be assigned scaling values for the length, width, and depth, for each landmark of the anatomy, if there are bone transformations involved for the new art style. If there are only mesh changes, then scaling values are assigned along X, Y, and Z axes for each landmark of the anatomy. The key landmarks of the anatomy may include, for example, eyes, mouth, nose, chin, jaw, cheek bone, ears, neck, upper arm, forearm, hands, pectorals, stomach, waist, hips, thighs, calves, feet, etc. In some embodiments, scale, translation, and rotation values are also provided to direct how additional deformations could be applied and scaled for 3D assets. The modifications that are made to the base figure are stored in memory as the deformations to the base figure for the new art style.

Standard deformations for identifying characteristics of a realistic avatar are provided for the base male figure and the base female figure. These standard deformations define the ways to shape and manipulate specific key landmarks of the anatomy to unique shapes, as desired by a user, to create identifying characteristics. The standard deformations are used by a user in the ready room VR 120 to design a unique avatar. A user selects a desired deformation of the base figure to create their unique 3D asset. One example is a head shape. The standard deformations shape the upper half and lower half of the head. For example, a user may modify the upper portion of the head of the base figure using a standard deformation to create a desired look for the 3D asset. As another example, eyebrows of the 3D asset may be deformed to shape the inner point position, inner arch curve and thickness, outer arch curve and thickness, as well as the outer point. This allows a user to create their unique avatar.

After the new style is sculpted in 304, standard deformations for unique characteristics may be overridden 306 to create specific expressions of those shapes in the new art style. The new override deformation may apply the same visual intention as the standard deformation on the same general anatomy of the avatar, but fit within the new art style. If a standard deformation is not overridden, then the standard deformation is applied during the transition to the new art style, as discussed in more detail below.

For example, an override deformation for a wider nose in a comic book art style would affect the same vertices and polygons of the base figure with the wider nose standard deformation but with different degrees of offsets to get a different visual effect from the standard deformation.

Once the new style is sculpted and the desired standard deformations are overridden, the new style is imported 308 to the artist tools 108. The new style is imported via the import module 460, discussed above. The deformation data for the new style is saved to a new deformation data file with metadata to link it back to the base figure as well as the overriding deformations. The overriding deformations are named and tagged for quick reference as an art style deformation type and are ready to be used on a 3D asset, as discussed in detail with respect to FIG. 2.

Figure 5:
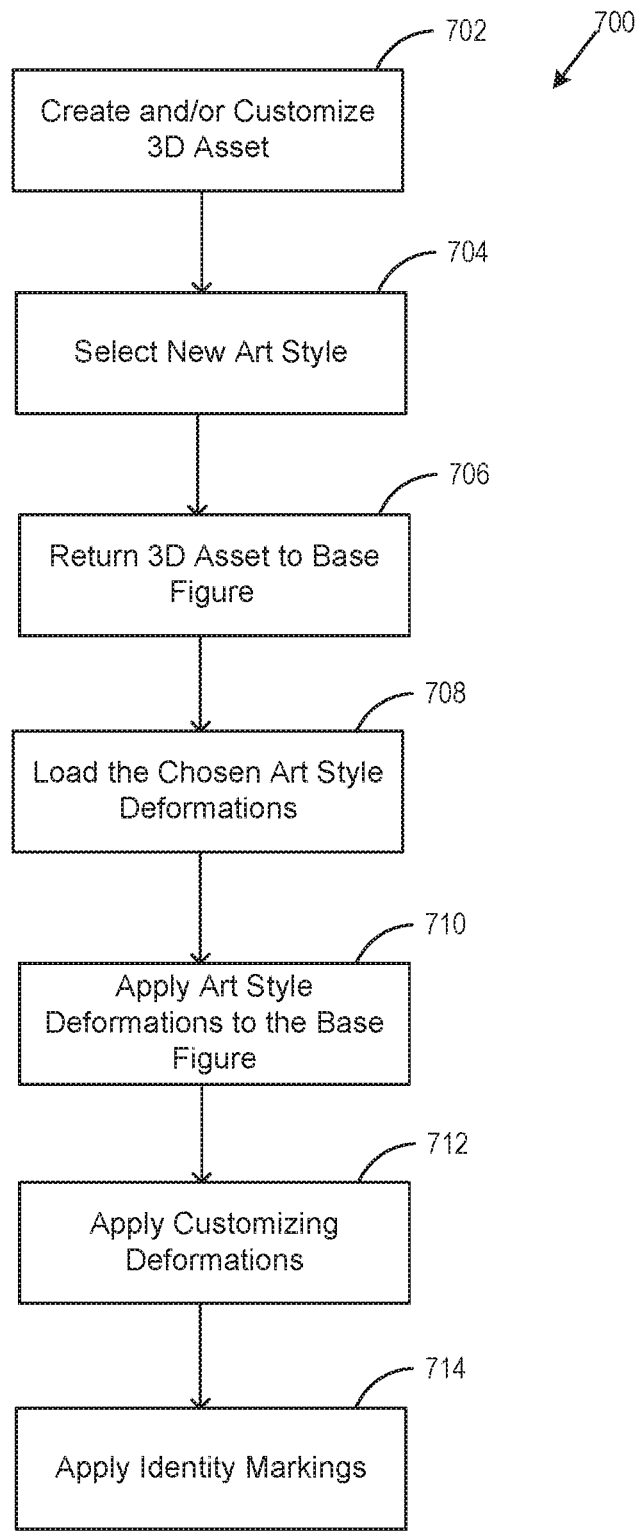
FIG. 5 is a flow chart for transitioning a 3D asset from one art style to another.

FIG. 5 illustrates a flow chart 700 for changing an art style of a unique avatar (e.g., 3D asset) created by a user. Initially, a user creates and/or customizes 702 a 3D asset to create the unique avatar, using the user interface 124 to interact with the ready room VR 120. The 3D character SDK 118, 518 comprises computer-readable instructions configured to affect the changes on the base figure (e.g., a base 3D asset), as discussed above with respect to FIG. 3.

A user can customize 702 the 3D asset through applications of standard deformations and applying identifying marks with a decal system for visual effects such as scars, tattoos, birth marks, and makeup and activating various assets for clothing or accessories such as glasses, earrings, facial piercings, etc.

The user may decide to then change the art style of the original 3D asset. The art style is selected 704 via the user interface 124 and the 3D character SDK 118 transitions the current style of the 3D asset to the selected art style. To transition the art style, the 3D character SDK 118 removes all previous modifications (e.g., customizing deformations, identifying characteristics, etc.) of the unique avatar, returning 706 the avatar to the default base figure (e.g., base 3D asset). The 3D character SDK 118 loads 708 the chosen art style deformations from the asset transfer client 116.

The 3D character SDK 118 applies 710 the chosen art style deformations to the base figure to begin creating a 3D asset that corresponds to the original 3D asset, but in a different style, along with any custom materials and shaders of the chosen art style. Then, customizing deformations are applied 712 to the base figure in an additive manner, layering each change to the base figure on top of a previous change. The customizing deformations are the deformations originally chosen by the user to create the original 3D asset. The customizing deformations chosen for the original 3D asset are scanned to check if there is an art style override. Standard deformations chosen for the original 3D asset are applied to their effected vertices if there is no art style override deformation. If there is an art style override deformation, then the art style override deformation is applied rather than the chosen standard deformation. If any scaling options were chosen by a user for a customized deformation to given anatomical landmarks, then the standard deformation gets its vertices offsets adjusted by a ratio multiplier associated to that landmark if there is no art style override scaling deformation. If there is an art style override scaling deformation, then the art style override scaling deformation is applied.

Once the customized deformations, or shaping deformations, are applied, identifying markings that were originally chosen for the original 3D asset are also applied 714 to the new 3D asset that corresponds to the original 3D asset in the different art style. Identifying marks, such as tattoos or birth marks, are applied to the same positions and scaled to fit on the same coordinate space or on the same average spacing between nearest vertices on the new 3D asset as the original 3D asset. The new 3D asset is then provided to or otherwise available to the user in the ready room VR 120.

Figure 6:
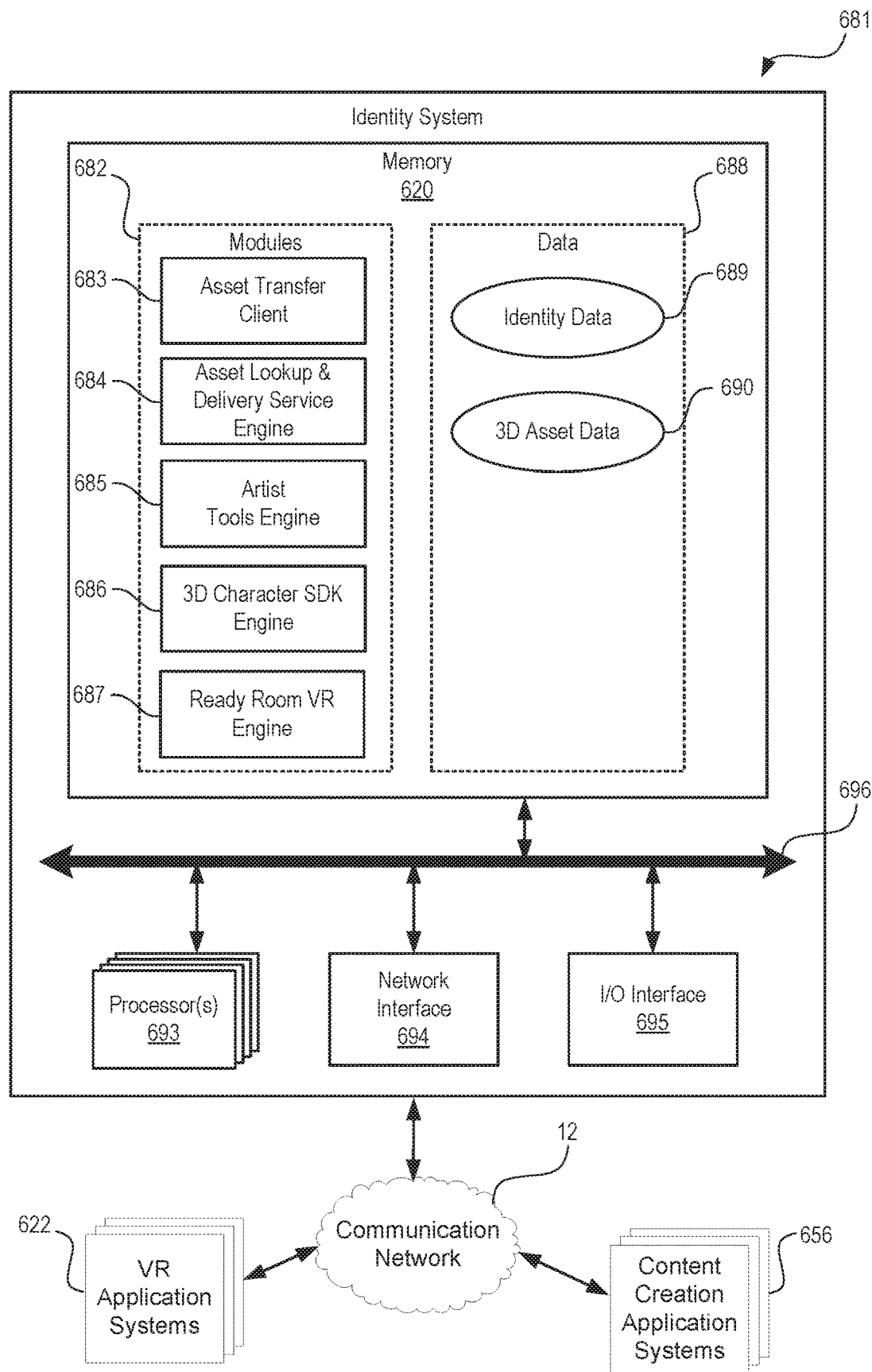
FIG. 6 is a block diagram of a persistent virtual identity system, according to one embodiment.

FIG. 6 is a block diagram of an identity system according to one embodiment. The mobile device identity system 681 can generate a persistent virtual identity that can be transferred between applications, potentially on different application systems 622. The identity system 681 can include a memory 620, one or more processors 693, a network interface 694, an input/output interface 695, and a system bus 696. The identity system 681 may be the similar to or analogous to the interface system 100 in FIG. 1. The identity system 681 may interface with one or more VR applications 622 via a communication network 12. The identity system 681 may provide persistent virtual identity for the VR application systems 622. The identity system 681 may also interface with one or more content creation application system 656 to obtain 3D assets.

The one or more processors 693 may include one or more general purpose devices, such as an Intel®, AMD®, or other standard microprocessor. The one or more processors 693 may include a special purpose processing device, such as ASIC, SoC, SiP, FPGA, PAL, PLA, FPLA, PLD, or other customized or programmable device. The one or more processors 693 can perform distributed (e.g., parallel) processing to execute or otherwise implement functionalities of the presently disclosed embodiments. The one or more processors 693 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 620 may include static RAM, dynamic RAM, flash memory, one or more flip-flops, ROM, CD-ROM, DVD, disk, tape, or magnetic, optical, or other computer storage medium. The memory 620 may include a plurality of program engines 682 (and/or modules) and program data 688. The memory 620 may be local to the identity system 681, as shown, or may be distributed and/or remote relative to the identity system 681.

The program engines 682 may include all or portions of other elements of the system 681. The program engines 682 may run multiple operations concurrently or in parallel with/on the one or more processors 693. In some embodiments, portions of the disclosed modules, components, and/or facilities are embodied as executable instructions embodied in hardware or in firmware, or stored on a non-transitory, machine-readable storage medium, such as the memory 620. The instructions may comprise computer program code that, when executed by a processor and/or computing device, cause a computing system (such as the processors 693 and/or the identity system 681) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 620 may also include program data 688. Data generated by the system 681, such as by the program engines 682 or other modules, may be stored on the memory 620, for example, as stored program data 688. The stored program data 688 may be organized as one or more databases. In certain embodiments, the program data 688 may be stored in a database system. The database system may reside within the memory 620. In other embodiments, the program data 688 may be remote, such as in a distributed computing and/or storage environment. For example, the program data 688 may be stored in a database system on a remote computing device.

The input/output interface 695 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 694 may facilitate communication with other computing devices and/or networks and/or other computing and/or communications networks. The network interface 694 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 694 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 696 may facilitate communication and/or interaction between the other components of the system, including the one or more processors 693, the memory 620, the input/output interface 695, and the network interface 694.

As noted, the interface system 681 also includes various program engines 682 (or modules, elements, or components) to implement functionalities of the system 681, including an asset transfer client engine 683, an asset lookup and delivery service engine 684, an artist tools engine 685, a 3D character SDK engine 686, and/or a ready room VR engine 687. These elements may be embodied, for example, at least partially in the program engines 682. In other embodiments, these elements may be embodied or otherwise implemented in hardware of the system 681. The system 681 also includes identity data 689 and 3D asset data 690 that may be stored in the program data 688 which may be generated, accessed, and/or manipulated by the program engines 682.

EXAMPLE EMBODIMENTS

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1

A system for switching a 3D asset between art styles, comprising: a user interface to receive an art style selection; and a 3D character software development kit (SDK) engine configured to: receive a selected art style from the user interface, remove customizing deformations from the 3D asset to return the 3D asset to a base 3D asset, receive style deformations based on the selected art style, apply the style deformations to the base figure to form a new 3D asset based on the selected art style, and apply the customizing deformations to the new 3D asset based on the selected art style.

Example 2

The system of example 1, wherein the 3D character SDK engine is configured to apply the customizing deformations to the new 3D asset based on the selected style by: determining whether the selected art style includes an override deformation for a customizing deformation; if there is an override deformation, applying the override deformation for the customizing deformation; and if there is not an override deformation, applying a standard deformation for the customizing deformation.

Example 3

The system of example 1, wherein the 3D character SDK engine is further configured to: determine identifying characteristics of the 3D asset; remove the identifying characteristics from the 3D asset to return the 3D asset to a base figure; and apply the identifying characteristics to the new 3D asset based on the selected art style.

Example 4

The system of example 3, wherein the 3D character SDK engine is configured to apply the identifying characteristics to the new 3D asset based on the selected style by: determining whether the selected art style includes an override deformation for an identifying characteristic, if there is an override deformation, applying the override deformation for the identifying characteristic and if there is not an override deformation, applying a standard deformation for the identifying characteristic.

Example 5

The system of example 1, wherein the identifying characteristics are least one of scars, tattoos, birth marks, make up, glasses, earrings, and facial piercings.

Example 6

The system of example 1, wherein the 3D character SDK engine is configured to compare the new 3D asset to standards of a destination application.

Example 7

The system of example 1, wherein the 3D character SDK engine is configured to modify the new 3D asset to the standards of the destination application when the new 3D asset does not conform to the standards of the destination application.

Example 8

The system of example 6, wherein when the new 3D assets does not conform the standards of the destination application, the 3D character SDK engine is configured to transmit options to a user through the user interface.

Example 9

An apparatus for switching a 3D asset between art styles, comprising: memory to store a 3D asset; and one or more baseband processing units configured to: receive a selected art style from a user interface, determine identifying characteristics of the 3D asset, remove the identifying characteristics from the 3D asset to return the 3D asset to a base figure, receive style deformations based on the selected art style, apply the style deformations to the base figure to form a new 3D asset based on the selected style, and apply the identifying characteristics to the new 3D asset based on the selected style.

Example 10

The apparatus of example 9, wherein the one or more baseband processing unit is further configured to determine whether the selected artistic style includes an override deformation for an identifying characteristic, if there is an override deformation, applying the override deformation for the identifying characteristic and if there is not an override deformation, applying a standard deformation for the identifying characteristic.

Example 11

A method for defining an artistic style of a 3D asset, comprising: receiving a base figure of a 3D asset; modifying the base figure based on an artistic style; receiving standard deformations of identifying characteristics for the base figure; modifying at least a portion of the standard deformations of the identifying characteristics to override deformations based on the artistic style and the identifying characteristic; and importing the modified base figure and override deformations into an artistic tools engine.

Example 12

The method of example 11, customizing the modified base figure with the artistic tools engine.

Example 13

The method of example 11, further comprising: receiving a different artistic style for the modified base figure; determining the identifying characteristics of the modified base figure; removing the identifying characteristics from the modified base figure to return the modified base figure to the base figure; receiving style deformations based on the selected artistic style; applying the style deformations to the base figure to form a new 3D asset based on the selected artistic style; applying the identifying characteristics to the new 3D asset based on the selected artistic style.

Example 14

The method of example 13, further comprising determining whether the selected artistic style includes an override deformation for an identifying characteristic, if there is an override deformation, applying the override deformation for the identifying characteristic and if there is not an override deformation, applying a standard deformation for the identifying characteristic.

Example 15

The method of example 13, wherein the identifying characteristics are least one of scars, tattoos, birth marks, make up, glasses, earrings, and facial piercings.

Example 16

The method of example 13, wherein the received different artistic style is inputted by a user.

Example 17

The method of example 13, wherein the received different artistic style is received from a destination application.

Example 18

The method of example 11, further comprising comparing the modified base figure to standards of a destination application.

Example 19

The method of example 18, wherein when the modified base figure does not conform the standards of the application, providing options to a user to enable the new 3D asset to conform the standards of the destination application.

Example 20

The method of example 18, wherein when the modified base figure does not conform to the standards of the application, modifying new 3D asset to conform to the standards of the destination application.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

The invention claimed is:

1. A system for switching a three-dimensional (3D) asset between art styles, comprising:
   a user interface to receive an art style selection; and
   a 3D character software development kit (SDK) engine configured to:
      receive a selected art style from the user interface, wherein the selected art style is one of a plurality of art styles, wherein each art style corresponds to different style deformations comprising a combination of one or more visual shapes, one or more materials, and one or more shaders to be used to form an initial 3D asset, wherein the one or more visual shapes, the one or more materials, and the one or more shaders are defined by an artist of the selected art style, and wherein each of the plurality of art styles are visually incongruent;
      remove customizing deformations from the initial 3D asset to return the initial 3D asset to a base figure, wherein the customizing deformations are deformations chosen by a user when creating the initial 3D asset;
      receive style deformations corresponding to the selected art style;
      apply the style deformations corresponding to the selected art style to the base figure to form a new 3D asset based on the selected art style, wherein the style deformations corresponding to the selected art style comprise one or more of a corresponding visual shape, a corresponding material, and a corresponding shader to be used to form the new 3D asset to visually fit the new 3D asset with the selected art style, wherein the new 3D asset is visually incongruent with a non-selected art style of the plurality of art styles; and
      apply the customizing deformations to the new 3D asset based on the selected art style, wherein the 3D character SDK engine is configured to apply the customizing deformations to the new 3D asset based on the selected style by:
         determining whether the selected art style includes an override deformation for at least one of the customizing deformations;
         if the selected art style includes the override deformation for the at least one of the customizing deformations, applying the override deformation for the at least one of the customizing deformations; and
         if the selected art style does not include the override deformation for the at least one of the customizing deformations, applying a standard deformation for the at least one of the customizing deformations.

2. The system of claim 1, wherein the 3D character SDK engine is further configured to:
   determine identifying characteristics of the initial 3D asset;
   remove the identifying characteristics from the initial 3D asset to return the initial 3D asset to the base figure; and
   apply the identifying characteristics to the new 3D asset based on the selected art style.

3. The system of claim 2, wherein the 3D character SDK engine is configured to apply the identifying characteristics to the new 3D asset based on the selected style by:
   determining whether the selected art style includes an override deformation for at least one of the identifying characteristics;
   if the selected art style includes the override deformation for the at least one of the identifying characteristics, applying the override deformation for the at least one of the identifying characteristics; and
   if the selected art style does not include the override deformation for the at least one of the identifying characteristics, applying a standard deformation for the at least one of the identifying characteristics.

4. The system of claim 2, wherein the identifying characteristics are least one of scars, tattoos, birth marks, make up, glasses, earrings, and facial piercings.

5. The system of claim 1, wherein the 3D character SDK engine is configured to compare the new 3D asset to standards of a destination application.

6. The system of claim 5, wherein the 3D character SDK engine is configured to modify the new 3D asset to the standards of the destination application when the new 3D asset does not conform to the standards of the destination application.

7. The system of claim 5, wherein when the new 3D asset does not conform to the standards of the destination application, the 3D character SDK engine is configured to transmit options to the user through the user interface.

8. An apparatus for switching a three-dimensional (3D) asset between art styles, comprising:
   memory to store an initial 3D asset; and
   one or more processing units configured to:
      receive a selected art style from a user interface, wherein the selected art style is one of a plurality of art styles, wherein each of the plurality of art styles corresponds to different style deformations comprising a set of visual shapes, materials, and shaders to be used to form the initial 3D asset, wherein the visual shapes, the materials, and the shaders are defined by an artist of the selected art style, and wherein each of the plurality of art styles are visually incongruent;

determine identifying characteristics of the initial 3D asset;

remove the identifying characteristics from the initial 3D asset to return the initial 3D asset to a base figure, wherein the identifying characteristics are characteristics chosen by a user when creating the initial 3D asset;

receive style deformations corresponding to the selected art style;

apply the style deformations corresponding to the selected art style to the base figure to form a new 3D asset based on the selected style, wherein the style deformations corresponding to the selected art style comprise one or more of a corresponding visual shape, a corresponding material, and a corresponding shader to be used to form the new 3D asset to visually fit the new 3D asset with the selected art style, wherein the new 3D asset is visually incongruent with a non-selected art style of the plurality of art styles;

apply the identifying characteristics to the new 3D asset based on the selected style;

determine whether the selected art style includes an override deformation for at least one of the identifying characteristics;

if the selected art style includes the override deformation for the at least one of the identifying characteristics, applying the override deformation for the at least one of the identifying characteristics; and if the selected art style does not include the override deformation for the at least one of the identifying characteristics, applying a standard deformation for the at least one of the identifying characteristics.

9. A method for defining an artistic style of a three-dimensional (3D) asset, comprising:

receiving an initial base figure of the 3D asset;

receiving a selected art style from a user interface, wherein the selected art style is one of a plurality of art styles, wherein each art style corresponds to different style deformations comprising a combination of visual shapes, materials, and shaders to be used to form the 3D asset, wherein the visual shapes, the materials, and the shaders are defined by an artist of the selected art style, wherein each of the plurality of art styles are visually incongruent;

modifying the initial base figure based on the artistic style to form a modified base figure, wherein the artistic style defines style deformations corresponding to the selected art style comprising one or more of a corresponding visual shape, a corresponding material, and a corresponding shader to be used to form the 3D asset to visually fit the 3D asset with the selected art style, wherein the 3D asset is visually incongruent with a non-selected art style of the plurality of art styles;

receiving standard deformations of identifying characteristics for the initial base figure, wherein the standard deformations of the identifying characteristics are deformations chosen by a user;

modifying at least a portion of the standard deformations of the identifying characteristics to override the portion of the standard deformations based on the artistic style and the identifying characteristics; and importing the modified base figure and the overridden portion of the standard deformations into an artistic tools engine.

10. The method of claim 9, customizing the modified base figure with the artistic tools engine.

11. The method of claim 9, further comprising:

receiving a different artistic style for the modified base figure;

determining the identifying characteristics of the modified base figure;

removing the identifying characteristics from the modified base figure to return the modified base figure to the initial base figure;

receiving style deformations corresponding to the received different artistic style;

applying the style deformations corresponding to the received different artistic style to the initial base figure to form a new 3D asset based on the received different artistic style; and applying the identifying characteristics to the new 3D asset based on the received different artistic style.

12. The method of claim 11, further comprising determining whether the received different artistic style includes an override deformation for at least one of the identifying characteristics;

if the received different artistic style includes the override deformation for the at least one of the identifying characteristics, applying the override deformation for the at least one of the identifying characteristics; and if the received different artistic style does not include the override deformation for the least one of the identifying characteristics, applying a standard deformation of the received different artistic style for the at least one of the identifying characteristics.

13. The method of claim 11, wherein the identifying characteristics are at least one of scars, tattoos, birth marks, make up, glasses, earrings, and facial piercings.

14. The method of claim 11, wherein the received different artistic style is inputted by the user.

15. The method of claim 11, wherein the received different artistic style is received from a destination application.

16. The method of claim 11, further comprising comparing the modified base figure to standards of a destination application.

17. The method of claim 16, wherein when the modified base figure does not conform to the standards of the destination application, providing options to the user to enable the new 3D asset to conform the standards of the destination application.

18. The method of claim 16, wherein when the modified base figure does not conform to the standards of the destination application, modifying the new 3D asset to conform to the standards of the destination application.

* * * * *